United States Patent
Horvath et al.

(10) Patent No.: US 6,693,927 B1
(45) Date of Patent: Feb. 17, 2004

(54) METHOD AND APPARATUS FOR OSCILLATOR START-UP CONTROL FOR MODE-LOCKED LASER

(75) Inventors: Christopher Horvath, Irvine, CA (US); Ruben Zadoyan, Irvine, CA (US)

(73) Assignee: IntraLase Corp., Irvine, CA (US)

( * ) Notice: Subject to any disclaimer, the term of this patent is extended or adjusted under 35 U.S.C. 154(b) by 0 days.

(21) Appl. No.: 10/242,828

(22) Filed: Sep. 13, 2002

(51) Int. Cl.$^7$ ................................ H01S 3/091
(52) U.S. Cl. ................. 372/18; 372/70; 372/75
(58) Field of Search ................. 372/75, 69, 70, 372/71, 34, 36, 18

(56) References Cited

U.S. PATENT DOCUMENTS

| | | | | |
|---|---|---|---|---|
| 5,265,115 A | * | 11/1993 | Amano | 372/75 |
| 5,793,485 A | * | 8/1998 | Gourley | 356/318 |
| 6,100,516 A | * | 8/2000 | Nerin et al. | 250/206.2 |
| 6,181,463 B1 | * | 1/2001 | Galvanauskas et al. | 359/330 |
| 6,476,916 B1 | * | 11/2002 | Lacot et al. | 356/445 |

* cited by examiner

Primary Examiner—Paul Ip
Assistant Examiner—Dung (Michael) T Nguyen
(74) Attorney, Agent, or Firm—Fulbright & Jaworski L.L.P.

(57) ABSTRACT

The invention is directed to an apparatus and method for oscillator start-up control, and more particularly to an apparatus and method for overdriving a laser to obtain mode-lock operation. The oscillator with start-up control has a lasing medium mounted on a base. A laser pumping source is mounted on the base for inducing a laser beam from the lasing medium. A mode-lock detection device is mounted about the base. An overdrive circuit is coupled with the mode-lock detection and signal processing device for determining mode-lock status of the oscillator. The overdrive circuit overdrives the pump source when the oscillator is not in mode-lock status.

20 Claims, 2 Drawing Sheets

METHOD AND APPARATUS FOR OSCILLATOR START-UP CONTROL FOR MODE-LOCKED LASER

BACKGROUND OF THE INVENTION

A mode-locked laser generates a train of very high-repetition rate pulses. For a laser to mode-lock, it is necessary that it oscillate in many different cavity modes at once and that these oscillations be in phase. Mode-locking is a special operation regime of lasers where an intra-cavity modulation (amplitude or phase modulator) forces all of the laser modes to operate at a constant phase, i.e., phase-locked or "mode-locked," so that the temporal shape of the laser output forms a continuously repeating train of short (typically in the range of picoseconds or femtoseconds) optical pulses. A saturable absorber is a commonly utilized mode-locking device.

A saturable absorber is a material that has decreasing light absorption with increasing light intensity. Saturable absorbers show this effect at intensities typical in solid-state laser cavities. The key parameters for a saturable absorber are its wavelength range (where it absorbs), its dynamic response (how fast it recovers), and its saturation fluence (at what pulse energy per unit area it saturates). The saturable absorber has a limit on how much fluence (energy/area) it can handle; above this fluence, the saturable absorber will get damaged. Also, once the laser is mode-locked, extended exposure to intracavity laser power may damage the saturable absorber when focusing the laser beam. Conversely, if insufficient energy is provided, then the saturable absorber will cease mode-locking.

Because of the foregoing and because of other nonlinear optical effects like self phase modulation and Kerr lens mode-locking contribution, it desirable for a device and method to overdrive an oscillator such that mode-locking begins. Furthermore, such device and method would provide a feedback loop to determine the mode-lock status of the oscillator and provide an overdrive to the oscillator pump source to initiate mode-locking and then reduce the laser energy to a minimum sustainable energy level. Additionally, the laser power should be reduced to avoid double pulsing due to high intracavity power.

BRIEF SUMMARY OF THE INVENTION

The present invention is directed to an apparatus and method for oscillator start-up control, and more particularly to an apparatus and method for overdriving a laser to obtain mode-lock operation.

To address the foregoing identified problem, a laser oscillator should be driven harder in the beginning for a short amount of time until the laser is in mode-locked operation and then the pump power reduced for normal operation. This can be achieved by overdriving the pump current of a pump diode during start up of the oscillator or when the oscillator stops mode-locking.

A feedback signal from the oscillator is needed which indicates if the laser is in mode-locked operation. The signal can be derived from a mode-lock detection device, such as a photodiode. The oscillator pump diode is extended in a way to ramp up the pump current for an adjustable amount of time and value whenever the feedback signals that the oscillator is not mode-locked.

In one aspect of the invention an oscillator with start-up control is comprised of a base, a lasing medium mounted on said base, a laser pumping source mounted on said base for inducing a laser beam from said lasing medium, said laser beam being directed along a path, a mode-lock detection device mounted about said base, and an overdrive circuit coupled with said mode-lock detection device and laser pumping source. By way of illustration, but not limitation, a laser pumping source may be a diode, a laser, an arc lamp, or other source.

The mode-locking device may be any device that can detect the mode-locked status of the oscillator. In one embodiment, the mode-lock detection device is a photodiode.

Various configurations of oscillators may be utilized with the present invention. In one embodiment of the invention, an oscillator has a lasing medium composed of Nd:glass. Other laser materials and crystals like Yb, Ti, Cr doped hosts and others would behave very similarly regarding the overdrive support.

A further aspect of the invention is an overdrive circuit. The overdrive circuit is configured to detect mode-lock status utilizing the mode-lock detection device. When the oscillator is not mode-locked, which may occur during initiation or normal operations of the oscillator, the overdrive current will provide a current to a pump source, for example laser pumping diode.

In one embodiment, the laser beam is formed of a continuously repeating train of short optical pulses in the range of picoseconds or femtoseconds.

In another aspect of the invention, a method for oscillator mode-locking, comprises the steps of (a) providing an overdrive current to an oscillator for a duration of time until said oscillator is mode-locked, (b) reducing the overdrive current to the laser oscillator to a normal operating current for said laser oscillator, and (c) periodically monitoring the oscillator to determine if the oscillator is mode-locked.

In yet a further aspect of the invention, steps (a)–(c) are performed if in step (c) the oscillator is not mode-locked.

In one embodiment of the invention, an error signal is generated if the oscillator is not mode-locked. A mode-lock detection device is used to determine if the oscillator is mode-locked. If the oscillator is not mode-locked, then a circuit monitoring the mode-lock status of the oscillator will generate an error signal.

For purposes of illustration, but not limitation, examples of the pulsed lasers suitable for use with the apparatus and method include Nd:glass lasers such as the IntraLase FS laser, an argon ion-pumped solid state mode-locked laser, such as the Coherent Inc. Inova (argon) and Mira (Ti:sapphire); a diode-laser-pumped solid state mode-locked laser, such as a continuous wave diode-pumped frequency-doubled YAG and mode-locked Ti:sapphire laser; and a direct diode-pumped mode-locked solid state laser.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
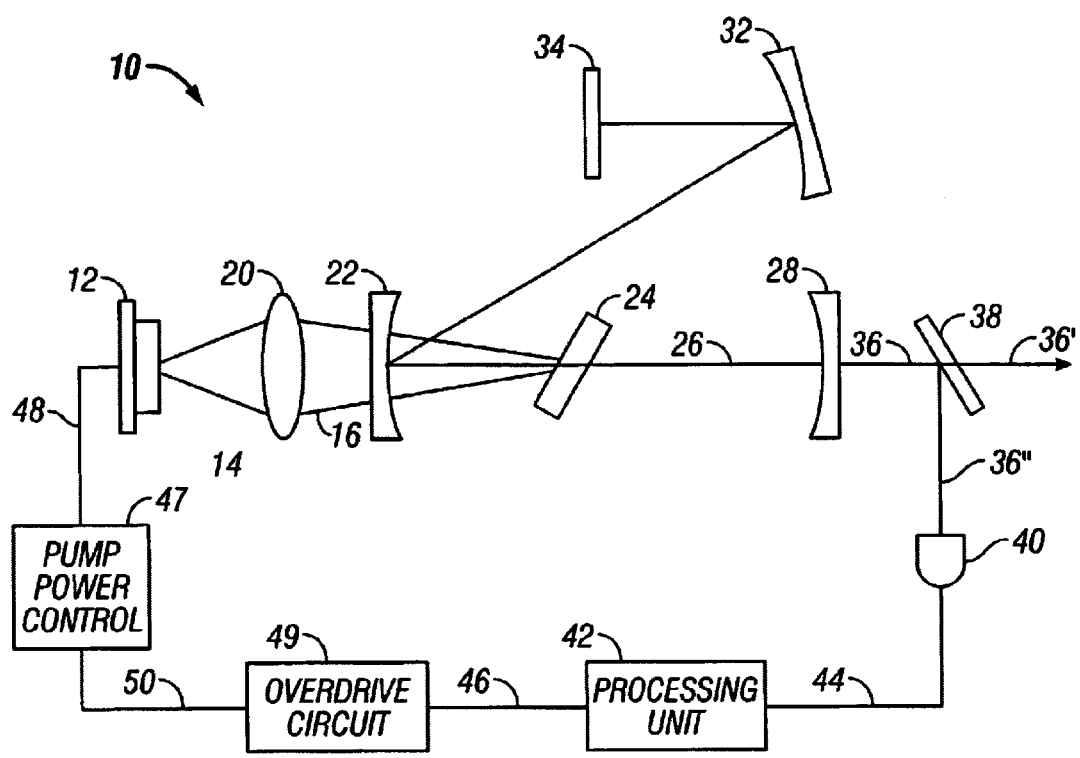
FIG. 1 is a schematic diagram of an oscillator that may be utilized with the present invention.

Referring initially to FIG. 1, a schematic diagram is shown of an oscillator 10 as may be used in accordance with the present invention. Various configurations of oscillators may be utilized with the present invention. As shown, the oscillator 10 includes a laser pumping diode 12 that is mounted on a base 14. The laser pumping diode 12 generates a laser beam 16 having a certain wavelength. As the light beam 16 leaves the laser pumping diode 12, lens 20 focuses the light beam 16 through a dichroic beam splitter 22 and onto a lasing medium 24.

In a manner well known by the skilled artisan, the light in beam 16 from laser pumping diode 12 will induce a laser beam 26 at the lasing medium 24. For example, the lasing medium 24 may be composed of Nd:glass. Once induced, the laser beam 26 will travel from the lasing medium 24 toward the output coupling mirror 28. For the purposes of disclosure, when referring to FIG. 1, it is to be appreciated that the laser beam 26, and the path on which it travels in the oscillator 10, are both designated with the number 26.

The output coupler 28 of the exemplified oscillator 10 is of a type which will reflect approximately >95% of the light in laser beam 26 that is incident on the output coupler 28. The remaining <5% of the light in laser beam 26, i.e. that portion of the beam 26 which is not reflected from the output coupler 28, is thus allowed to leave the oscillator 10. On the other hand, the >95% of the light in laser beam 26 that is reflected from output coupler 28 is directed back toward the dichroic beam mirror 22.

The laser beam 26 is reflected at the mirror 22 toward the turning mirror 32 where, in turn, it is reflected toward the mirror 34. The mirror 34 is constructed with a multi layer semiconductor structure of a type that is commonly known by those skilled in the art as an Antiresonant Fabry Perot Saturable Absorber (AFPSA) or Semiconductor Saturable Absorber Mirror (SESAM). The SESAM is a semiconductor saturable absorber built into a mirror structure. This structure results in a device, which reflects more light at higher intensity. SESAMs can cover various wavelengths from <800 nm to >1600 nm, pulsewidths from femtoseconds to nanoseconds, and average power levels from milliwatts to >10 Watts.

From the mirror 34, the laser beam 26 is then reflected back along its path 26 to the output coupler 28. On its return path, the laser beam 26 is reflected, in order, by turning mirror 32, mirror 22. At the output coupler 28, more than 95% of the light in beam 26 is again reflected for a round trip between the output coupler 28 and the mirror (SESAM) 34. This continues in a manner well known in the art, until a pulsed laser beam 36, useful, for example, in ophthalmic surgery, has been generated. As disclosed herein, the optical elements between mirror 34 and the output coupler 28 define what is more commonly referred to as the cavity of the oscillator 10.

Dispersion control for the light in beam 26 inside the cavity of the oscillator 10 is required in order to create and maintain a pulsed laser beam 26. For the oscillator 10 of the present invention, this is provided by a chirped coating which is appropriately layered onto the reflective surfaces of the reflecting elements, mirror 22, output coupler 28, turning mirror 32 and mirror 34, such that the group velocity of the shorter wavelengths (e.g. blue) is increased relative to that of the longer wavelengths (e.g. red).

As the pulsed laser beam 36 (i.e. 5% of the laser beam 26) is emitted from the cavity of oscillator 10 by the output coupler 28 it is directed toward a beam splitter 38 which allows about ninety percent (90%) of the beam 36 to pass through as a useable beam 36'. The beam 36' (i.e. 90% of beam 36) is intended primarily for use in ophthalmic surgical procedures. The remaining ten percent (10%) of beam 36 is reflected from the beam splitter 38 toward a light detector 40 as a sample beam 36".

As shown in FIG. 1, the light detector 40 is connected to processing unit 42 via a line 44. The processing unit 42 is connected via a line 46 with an overdrive circuit 49. Overdrive circuit 49 is connected via line 50 with pump power control 47, and the pump power control 47 is connected via line 48 to pump diode 12.

Figure 2:
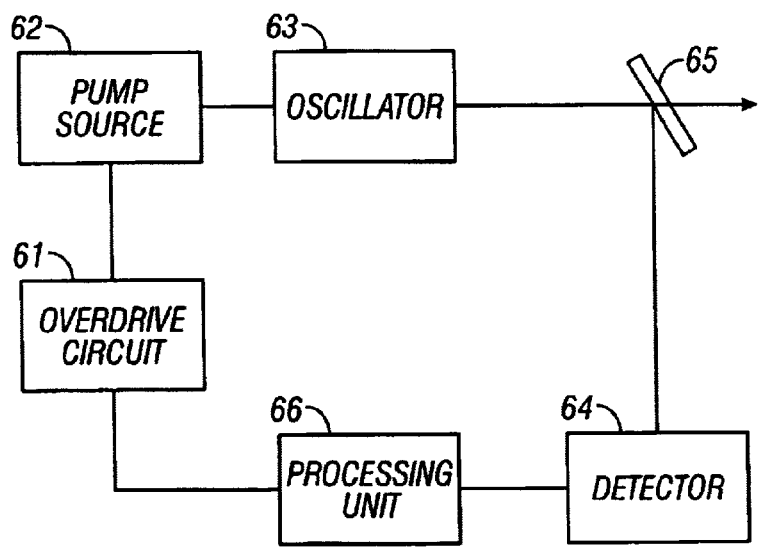
FIG. 2 is a block diagram of a feedback loop and monitoring circuit.

Referring now to FIG. 2, a simplified block diagram is illustrated showing a feedback loop and overdrive circuit 61 for overdriving a pump source 62 so as to initiate/maintain oscillator mode-locking. A pump source 62 is coupled to an overdrive circuit 61. The pump source 62 provides a pump power for an oscillator 63 that is capable of performing in mode-locked operation. A mode-lock detection device 64 is coupled with the oscillator 63 via beam splitter 65 and processing unit 66 to detect mode-lock operation. A photodetector, preferably a photodiode, is used as the mode-lock detection device. Other types of photodetectors may be used including a CCD, photomultiplier, or phototransistor. Additionally, a spectrometer, spectrum analyzer, frequency doubling detector, nonlinear intensity detector, or autocorrelator may be used as a mode-lock detection device. The processing unit 66 is then connected to the overdrive circuit 61, and the overdrive circuit 61 is connected with the pump source 62 thereby forming a feedback loop.

Figure 3:
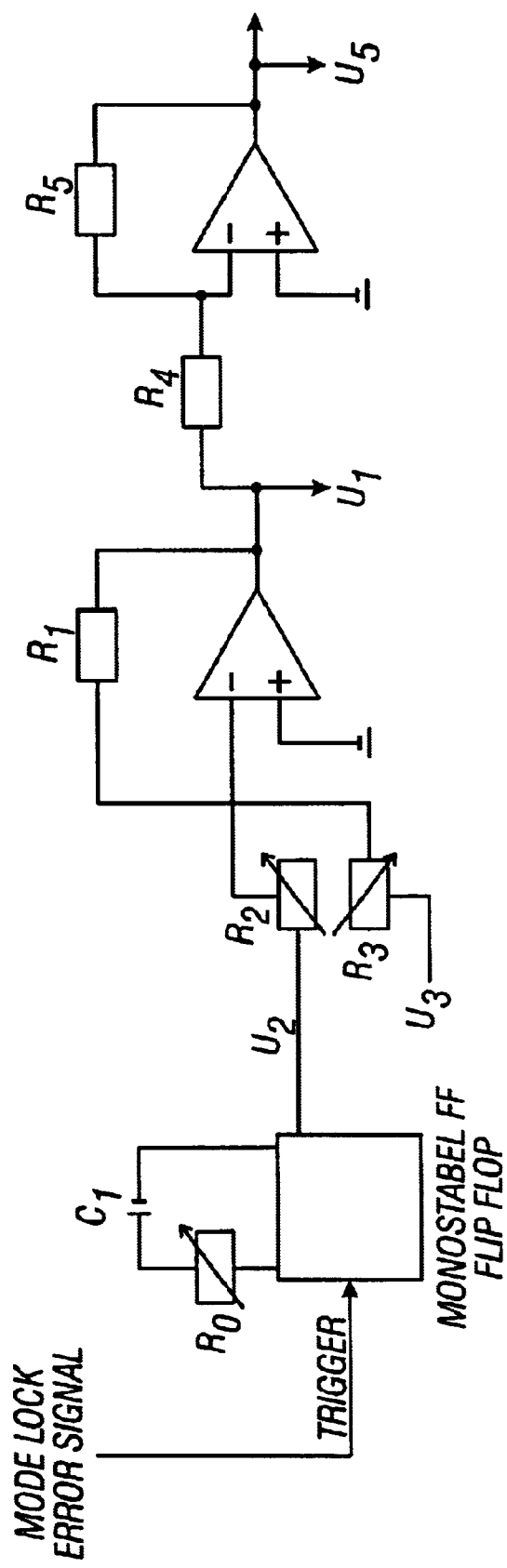
FIG. 3 is schematic diagram of an electronic circuit to overdrive a laser pumping source.

Referring now to FIG. 3, one embodiment of circuitry is shown for overdriving a pump source. The incoming mode-lock error signal is digital (e.g. 1 if the laser is not properly mode-locked) and comes from the processing unit which analyses the signal from the detection device. It triggers a mono stable flip flop and switches the exit U2 into the high state for a certain period of time. The up time is adjusted by the R0*C1 time constant (typically around 3 seconds). The following op amp works as an inverting additioner. It adds the overdrive voltage U2*(R1/R2) to the base setting U3*(R1/R3) of the pump source. U3 is a fixed reference voltage. The result of this addition is then inverted back and amplified by the second op amplifier (gain is −R5/R4). The final exit voltage U5 is put into the pump source to drive it proportionally. Alternative circuitry may be used provided that the circuitry in response to the oscillator going out of mode-lock operation provides an overdrive for a limited period of time to place the oscillator back into mode-lock operation.

The particular percentage for overdriving a particular laser will be somewhat dependent on laser variables including the gain material used, the saturable absorber used, the coating of mirrors, and the design of the laser cavity. However, the specific power necessary to initiate mode-lock for a given oscillator can be determined by a laser operator. This base power level is then increased by a certain amount or percentage to place the oscillator into mode-lock operation. A sufficient increase in power should be used, but should be limited such that the saturable absorber or other components of the laser do not get damaged. Percentage increase of overdrive current over the base current necessary for mode-lock operation in one embodiment ranged from 3%–60%. Other oscillators may range from 1% to 500% of overdrive current. Again, it is important that the base current for initiating mode-lock operation be determined.

For example, in one embodiment of the invention, an oscillator with a diode pump laser has an operating current of 0.8 amps. Upon initiation of the oscillator, the diode pump laser is provided an overdrive current of 200 mA. A feedback loop including a photodetector monitors the active laser to determine when the active laser achieves mode-lock operation. When the active laser achieves mode-lock operation, the overdrive current will be reduced to a normal operating current. Subsequently, the active laser is monitored. If the active laser goes out of mode-locked operation, then an error signal is generated. A circuit receives that signal, which is configured to provide an overdrive current to the diode pump laser, until the active laser is again in mode-lock operation. During operation of the active laser, periodic monitoring continues.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An oscillator with start-up control comprising:
   a lasing medium;
   a laser pumping source for inducing a laser beam from said lasing medium, said laser beam being directed along a path;
   a mode-lock detection device for monitoring said laser beam;
   a processing unit connected to said mode-lock detection device, said processing unit configured for detecting mode-lock status, and
   an overdrive circuit connected with said processing unit and laser pumping source, said overdrive circuit configured to provide a current to said laser pumping source so as to initiate oscillator mode-locking.

2. The oscillator with start-up control of claim 1, wherein the mode-lock detection device is a photodetector.

3. The oscillator with start-up control of claim 2, wherein the photodetector is any one of a photodiode, photomultiplier, or phototransistor.

4. The oscillator with start-up control of claim 1, wherein the mode-lock detection device is any one of a spectrometer, spectrum analyzer, frequency doubling detector, nonlinear intensity detector, or autocorrelator.

5. The oscillator with start-up control of claim 1, wherein the lasing medium is composed of Nd:glass.

6. The oscillator with start-up control of claim 1, wherein the laser pumping source is any one of a diode, a laser, or an arc lamp.

7. The oscillator with start-up control of claim 1, wherein the laser beam is formed of a continuously repeating train of short optical pulses in the range of picoseconds.

8. The oscillator with start-up control of claim 1, wherein the laser beam is formed of a continuously repeating train of short optical pulses in the range of femtoseconds.

9. A method for oscillator mode-locking, comprising the steps of:
   (a) providing an overdrive current to an oscillator for a duration of time to initiate mode-locking;
   (b) reducing said overdrive current to said laser oscillator to a normal operating current for said laser oscillator; and
   (c) periodically monitoring said oscillator to determine if said oscillator is mode-locked.

10. The method of claim 9, further comprising the steps of:
    (d) performing steps (a)–(c) if in step (c) the oscillator is not mode-locked.

11. The method of claim 9, further comprising the steps of:
    (d) generating an error signal if oscillator is not mode-locked.

12. The method of claim 9, wherein the oscillator is comprised of:
    a lasing medium;
    a laser pumping source for inducing a laser beam from said lasing medium, said laser beam being directed along a path;
    a mode-lock detection device for monitoring said laser beam;
    a processing unit connected to said mode-lock detection device, said processing unit configured for detecting mode-lock status; and
    an overdrive circuit connected with said processing unit and laser pumping source, said overdrive circuit configured to provide a current to said laser pumping source so as to initiate oscillator mode-locking.

13. The method of claim 12, wherein the mode-lock detection device is a photodetector.

14. The method of claim 13, wherein the photodetector is any one of a photodiode, photomultiplier, or phototransistor.

15. The method of claim 12, wherein the mode-lock detection device is a any one of a spectrometer, spectrum analyzer, frequency doubling and nonlinear intensity detectors, or autocorrelator.

16. The method of claim 12, wherein the lasing medium is composed of Nd:glass.

17. The method of claim 12, wherein the laser pumping source is any one of a diode, a laser, or an arc lamp.

18. The method of claim 12, wherein the laser beam is formed of a continuously repeating train of short optical pulses in the range of picoseconds.

19. The method of claim 12, wherein the laser beam is formed of a continuously repeating train of short optical pulses in the range of femtoseconds.

20. The method of claim 14, wherein the laser pumping source is any one of a diode, a laser, or an arc lamp.

* * * * *